Figure 1:
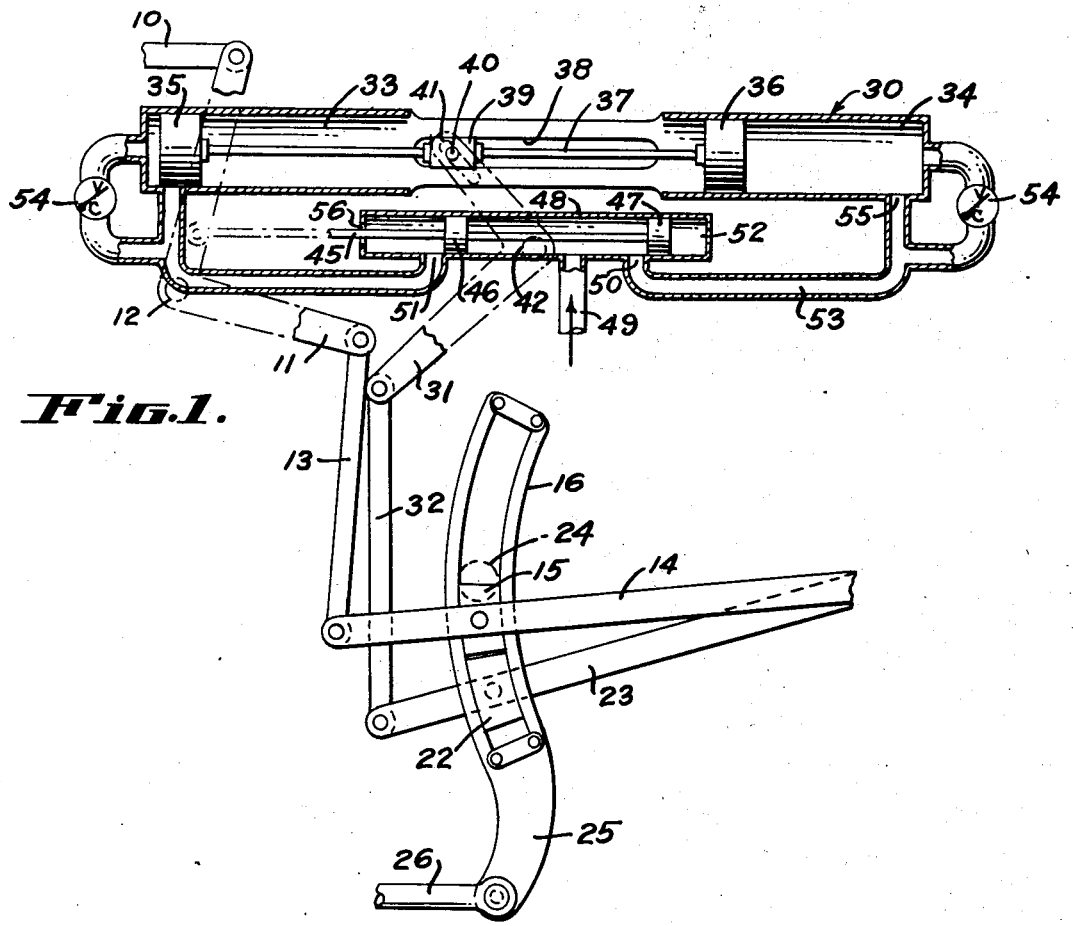

March 18, 1941.  M. W. DADEY  2,235,204

LOCOMOTIVE VALVE OPERATING DEVICE

Filed Feb. 12, 1937   3 Sheets-Sheet 1

INVENTOR.
MARTIN W. DADEY.
BY Jas M Naylor
ATTORNEY.

March 18, 1941.   M. W. DADEY   2,235,204
LOCOMOTIVE VALVE OPERATING DEVICE
Filed Feb. 12, 1937   3 Sheets-Sheet 2

INVENTOR.
MARTIN W. DADEY.
BY Jas. M. Naylor
ATTORNEY.

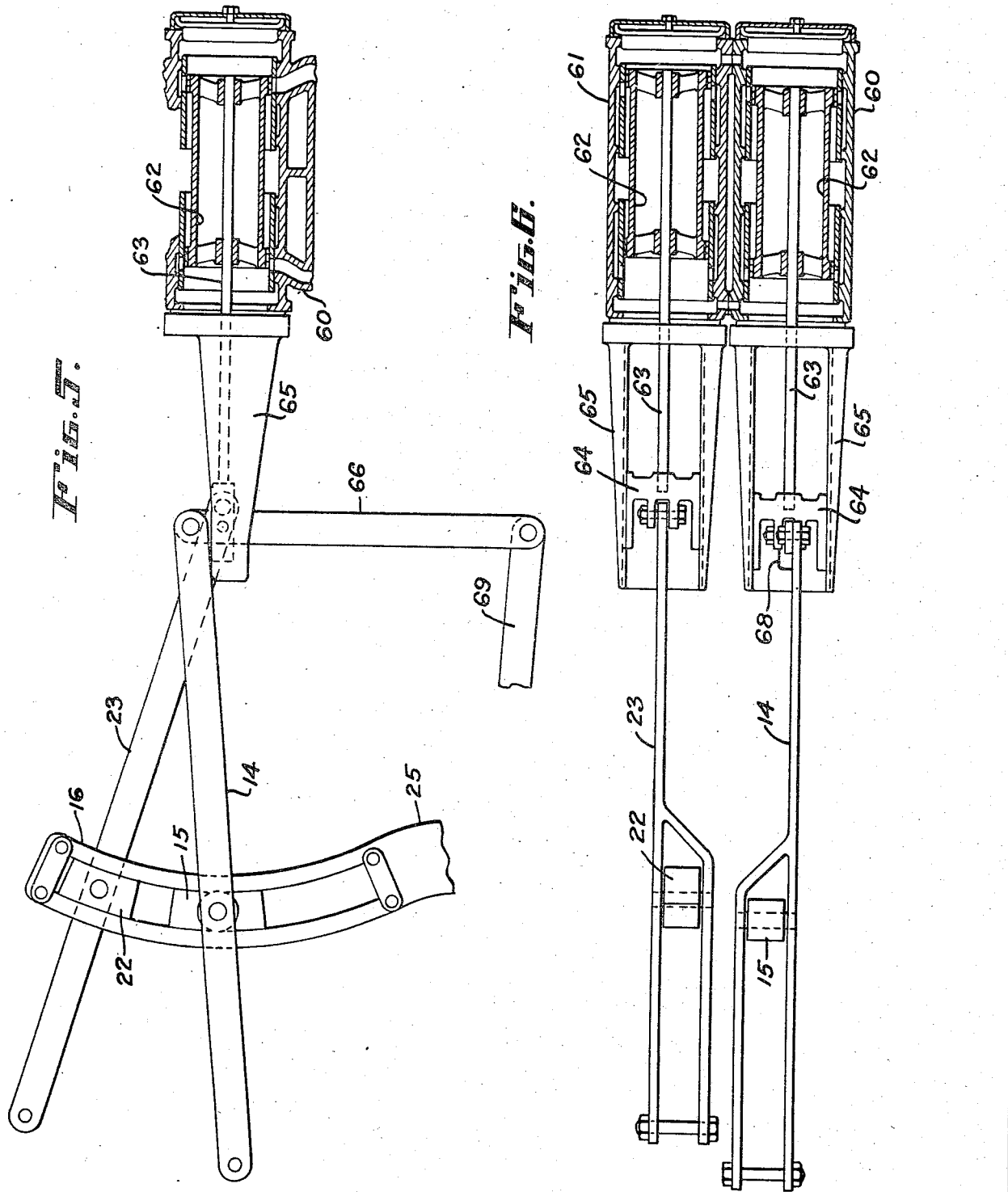

Patented Mar. 18, 1941

2,235,204

UNITED STATES PATENT OFFICE 2,235,204

LOCOMOTIVE VALVE OPERATING DEVICE

Martin W. Dadey, Oakland, Calif.

Application February 12, 1937, Serial No. 125,412

5 Claims. (Cl. 121—162)

This invention relates to the operation of steam valves for railroad locomotives.

It is an object of the invention to provide for the independent operation of exhaust valves on locomotives or steam engines of any kind. A particular object is the provision of means for automatically shifting the exhaust valves of such locomotives from forward to reverse position upon operation of the control for the admission valves.

It is another object of this invention to provide an efficient mechanism for the stated purpose through the use of which important economies in railroad operation will be attainable.

In general the present invention contemplates the use of power operated means to shift the exhaust valve gears, the control of the power operated means being provided in the mechanism adapted to control the admission valves. In other words, it contemplates the use of novel means, such as a power operated cylinder, to reverse one of two or more steam valves, there being manual control for the other valve or valves.

These and other objects and characteristics will become more apparent as this specification progresses and the particular novelty of the invention will be defined in the appended claims.

Figure 4:
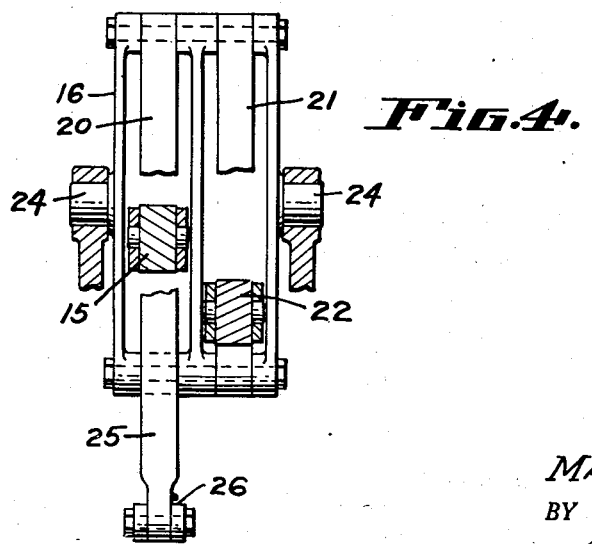
Figure 2:
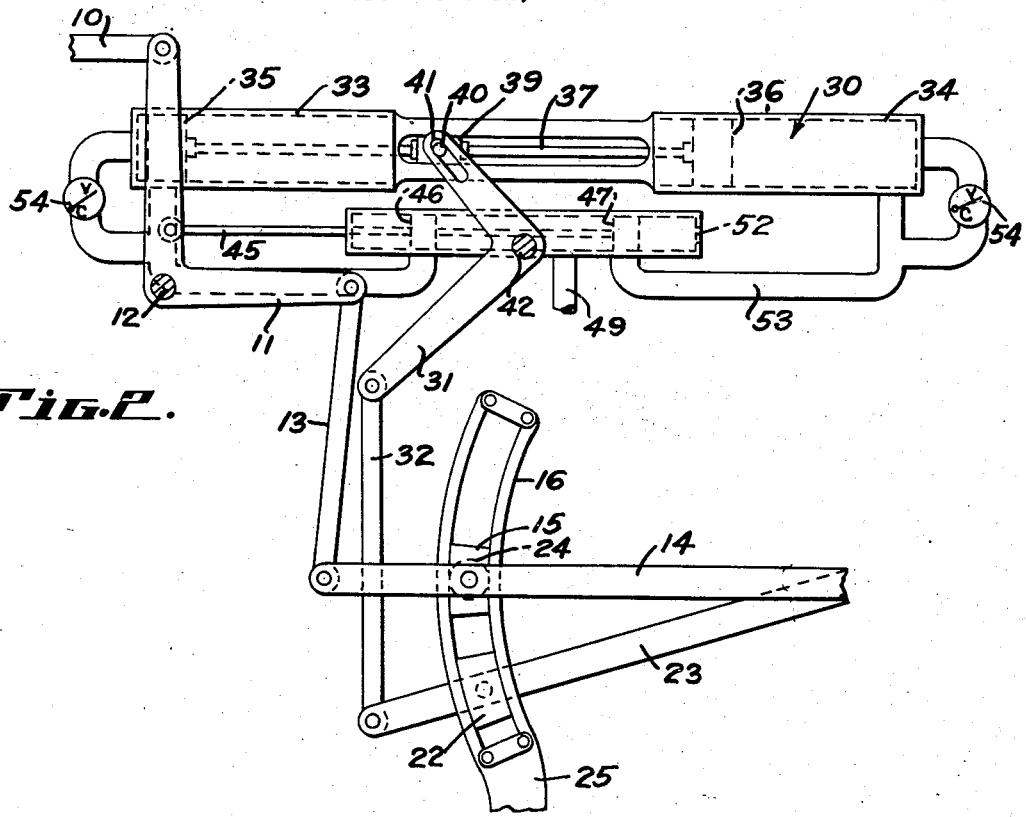
Figure 3:
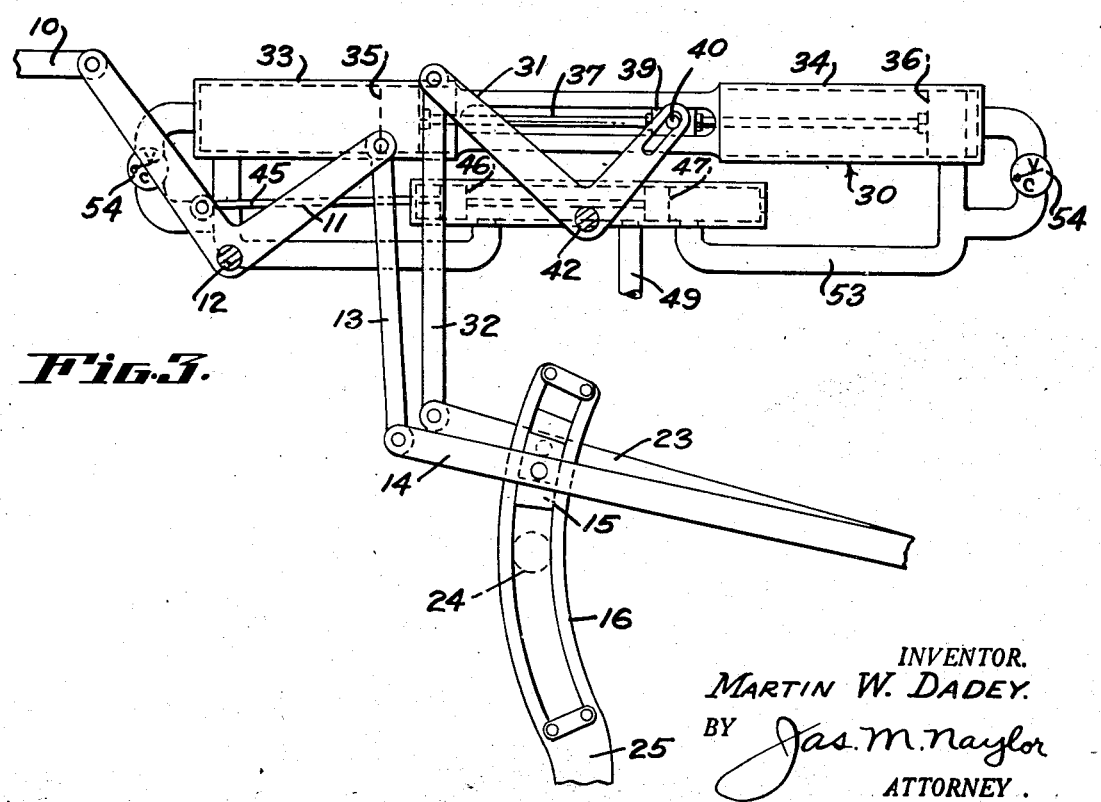

In the drawings forming a part hereof,

Figure 1 is a side elevation showing the valves in forward position, with certain parts shown in section, Figure 2 is a side elevation showing the valves in neutral position, Figure 3 is a side elevation showing the valves in reverse position, Figure 4 is an end view, partly broken away, of the link and blocks employed in the present invention, and Figure 4 is a side elevation, partly in section, of one type of valve means operable by the linkages forming the subject matter of the invention.

Figure 6 is a top plan view, partly in section, of the assembly illustrated in Figure 5.

In the accompanying drawings I have illustrated my invention as adapted for use in conjunction with the Walschaert type valve gears, which is well known and understood in this art. It is to be understood, however, that the principle of the invention is not limited to such use and is adaptable for use with other valve gear control mechanisms.

A reach rod 10, extending to the engine cab for manual control by such conventional means as a lever and quadrant (not shown) is connected at its outer end to a bellcrank 11, on the tumbling shaft 12. The bellcrank 11, in turn, is operatively connected, by a rod 13, to the admission valve control rod 14.

A block 15, pinned to rod 14, in link 16, permits the usual adjustment of the admission valves as to neutral, forward and reverse positions, as well as the cut-off, once the locomotive is under way.

The link 16, in the present adaptation (see Fig. 4) comprises two guide sections 20 and 21, the former containing block 15 and the latter block 22 pinned to the exhaust valve rod 23. Other than the provision of the two guides the link 16 is of conventional construction, having center pins 24 by which it is pivotally mounted in any well known way, and an integral leg 25 for suitable connection to an eccentric (not shown) through rod 26.

While it will be appreciated from the foregoing description that the control of the admission valves is manual, or through some power operated device which is in turn manually controlled, the following matter will reveal that the control of the exhaust valves as to forward and reverse, is fully automatic. First, however, let it be said that the present invention does not concern itself with the specific adjustment of the particular exhaust valve being used. That adjustment is understood, for present purposes, as having been made at the cylinder head. Thus, the present invention is directed toward the provision of means whereby the shifting of the exhaust valves from full open forward position to full open reverse position may be conveniently effected.

These specific objects are accomplished through the provision of an air cylinder 30, operatively connected to the exhaust valve rod 23 by a bellcrank 31 and rod 32, which will automatically reverse the exhaust valves upon operation of reach rod 10.

Air cylinder 30 comprises a pair of cylinders 33 and 34 having pistons 35 and 36, respectively, therein, said pistons having a common rod 37. The cylinders 33 and 34 are held in spaced relation by a guide 38 for the block 39 on rod 37. It is to this block 39 that bellcrank 31 is connected. A pin 40 on the block 39 is engaged by the elongated slot 41 in the upper leg of the bellcrank 31, which connection permits free movement of the bellcrank 31 about its axis (shaft 42) when air is admitted to the cylinders 33 and 34.

The valves for cylinders 33 and 34 are shown to best advantage in Figure 1 of the drawings. A control rod 45, pivotally connected to bellcrank 11, or, if preferred, connected to a lever on the tumbling shaft 12, has a pair of pistons 46 and 47 thereon, slidably movable in cylinder 48 to open and close the ports therein.

When bellcrank 11 has been moved to the position shown in Figure 1, air coming into cylinder 48 through pipe 49 is vented to cylinder 34 through port 50, since piston 46 closes off corresponding port 51 and piston 47 has closed off exhaust port 52. The air vented through port 50 passes through pipe 53 and initially through check valve 54 into cylinder 34. This initial direction of flow results from the fact that at the moment port 50 is opened the piston 36 is in full forward position (opposite that shown in Figure 1, in which see piston 35) thus closing off port 55 in cylinder 34. When sufficient air has entered cylinder 34 through check valve 54 to move piston 36 past port 55, air from pipe 53 passes through the latter port and the check valve 54 to complete the stroke of piston 36.

It will be understood, of course, that in effecting this movement of piston 36, provision has to be made to allow piston 35 to move against the air in cylinder 33. To this end cylinder 33 is equipped with the same control means as is opposing cylinder 34, there being a check valve 54 at the end of the cylinder, a port 55 adjacent the same end and adapted to be closed off by the piston 35, and a pipe 53 in communication with port 55, check valve 54 and port 51. Furthermore, this end of cylinder 48 is provided with an exhaust port 56, corresponding to the port 52 at the opposite end. It will thus be seen that when piston 36 is moved in cylinder 34 by pressure of air thereon, piston 35 will displace the air in cylinder 33 through its port 55, pipe 53, port 51 and finally, exhaust port 56.

Check valves 54 are one-way against the pistons 35 and 36. Hence, when said pistons 35 and 36 close off the respective ports 55 in their return movement, a small amount of air will be trapped in the ends of the cylinders and against the check valves to serve as a cushion preventing the pistons from striking the cylinder ends.

While it is obvious that the present invention does not concern itself with the operation of any specific valve and that the linkages herein shown and claimed are susceptible of practicable use with many types of valve means, Figures 5 and 6 of the drawings illustrate one example.

Conventional admission and exhaust valves 60 and 61, respectively, mounted on the main steam cylinder in the usual way (not shown) are provided with customary pistons 62. Each of the pistons 62 has a rod 63 attached to a cross-head 64, adapted to travel in the guides 65, formed as extensions of the valves 60 and 61.

While the connection between exhaust valve rod 23 and the cross-head 64 for exhaust valve 61 is a direct pivotal connection (see Fig. 6), the coupling of admission valve rod 14 and valve 60 takes a slightly different form. A lever 66 is pivotally connected, adjacent its upper end, to the cross-head for valve 60 and extends downwardly through a slot 68 in the guide 65, for suitable operative connection with a cross-head (not shown) through the medium of the link 69. Rod 14 is connected to the free end of lever 66 above its connection with cross-head 64. In this well understood, conventional assembly, movement of link 16 and rod 14 drives the piston in cylinder 60 substantially the full length of its stroke and the stroke is completed to open the ports of valve 60 upon forward movement of the cross-head with which levers 69 and 66 are operatively connected.

It is believed that the operation of the apparatus forming the subject matter of this invention will be fully understood from the foregoing description, but to summarize: Assuming the engine to be at a standstill and that it is desired to move forwardly, the valves will be found in the neutral position shown in Figure 2. The engineer moves the cab lever on the quadrant to manipulate the reach rod 10. As reach rod 10 is moved forwardly, bellcrank 11 turns about its pivot 12 and through the connecting rod 13 the admission valve control rod 14 is thrust downwardly carrying its block in link 16 from neutral position to full open position. With the admission valves thus open a full charge of steam is admitted to the driving piston and the engine begins its initial movement. In this movement of bellcrank 11 to open the admission valves it will be understood that valve control rod 45 attached thereto has been thrust forwardly moving pistons 46 and 47 in cylinder 48 from the position shown in Figure 2 to that shown in Figure 1, establishing communication between the source of compressed air and cylinder 34 and opening exhaust port 56 to the discharge of air from cylinder 33. Thus piston 36 is actuated in cylinder 34 and movement of block 39 and guide 38 is effected. Through the connection of block 39 and bellcrank 31 the latter is moved about its pivot to move exhaust valve control rod 23 from its full open reversing position to its full open forward position (see Fig. 1).

As the acceleration of the engine progresses the engineer hooks the admission valve control lever back on the quadrant moving the block or rod 14 in link 16 up toward dead center to effect the desired cut-off of steam.

Assuming now that the engine has been brought to a dead stop and it is desired to put the same in reverse the engineer upon pulling reach rod 10 rearwardly in the cab swings bellcrank 11 about its pivot 12 causing the block of rod 14 to move from neutral position into the position illustrated in Figure 3 of the drawings, that is, full open reverse position. In this operation piston 35 is actuated in cylinder 33, since control rod 45 is drawn rearwardly to open intake port 51 and exhaust port 52 while closing off intake port 50 and exhaust port 56. Block 39 then travels to the opposite end of guide 38 to that shown in Figure 1 and bellcrank 31 draws exhaust valve control rod 23 and its retaining block 22 upwardly in link 16 to its full open reverse position.

It is to be appreciated that while only a preferred form of my invention has been illustrated and described herein, that the principle thereof is subject to many modifications and changes and therefore I do not wish to be limited to only the form shown but desire full protection according to the scope of the appended claims.

Having thus described my invention, what I desire to secure by grant of Letters Patent, and therefore claim is:

1. In a locomotive having a cylinder and steam admission and exhaust valves therefor, means for controlling said valves comprising in combination, levers for said valves, blocks on said levers, a link for said blocks, a reach rod operatively connected to said admission valve levers, said connection including a bellcrank, a power operated cylinder operatively connected to said exhaust valve lever, and control means for said power operated cylinder connected for positive actuation by said bellcrank upon operation of said reach rod.

2. In a locomotive having a cylinder and steam admission and exhaust valves therefor, means for controlling said valves comprising in combination a pivotal link, a pair of blocks slidably received thereby, admission and exhaust valve control rods each operatively connected to one of said blocks, manual control means for adjusting said admission valve control block in said link from a full open forward position to a full open reverse position with intermediate adjustments, power operated means for adjusting said exhaust valve control block in said link from a full open forward position to a full open reverse position, and control means for said power operated means operatively connected to said manual control means for said admission valve.

3. In a locomotive having a cylinder and steam admission and exhaust valves therefor, means for controlling said valves comprising in combination a link, a pair of blocks slidably received in said link, admission and exhaust valve control rods each operatively connected to one of said blocks, a reach rod operatively connected to one end of said admission valve control rod to adjust the position of the connected block in said link, a bellcrank operatively connected to one end of said exhaust valve control rod, power operated means connected to said bellcrank for movement of the connected exhaust valve control rod from a full open forward position to a full open reverse position, and means having a positive operative connection to said reach rod for controlling said operated means.

4. In a locomotive having a cylinder and steam admission and exhaust valves therefor, means for controlling said valves comprising in combination a link, a pair of blocks slidably received in said link, admission and exhaust valve control rods each operatively connected to one of said blocks, a bellcrank operatively connected to said admission valve control rod to adjust the position of the connected block in said link, a reach rod operatively connected to said bellcrank, a second bellcrank operatively connected to said exhaust valve control rod to adjust the position of the connected block in said link, power operated means connected to said second named bellcrank for movement of the latter into two positions, and means connected to the first named bellcrank for automatically controlling said power actuated means upon operation of said reach rod.

5. In a locomotive having a cylinder and steam admission and exhaust valves therefor, the combination of means for controlling said valves comprising a pivotal link, a pair of blocks slidably received thereby, admission and exhaust valve control rods each operatively connected to one of said blocks, a bellcrank operatively connected to said admission valve control rod to adjust the position of the connected block in said link, a reach rod operatively connected to said bellcrank, a second bellcrank operatively connected to said exhaust valve control rod to adjust the position of the connected block in said link, a pair of opposed power operated cylinders, pistons therein on a common rod, a block on said piston rod, said block being operatively connected to said second named bellcrank, and control means for said power operated cylinder automatically actuated upon operation of said reach rod.

MARTIN W. DADEY.